F. N. G. KRANICH.
FEEDING MECHANISM FOR ENSILAGE CUTTERS AND ANALOGOUS MACHINES.
APPLICATION FILED OCT. 23, 1911.
1,184,357.
Patented May 23, 1916.
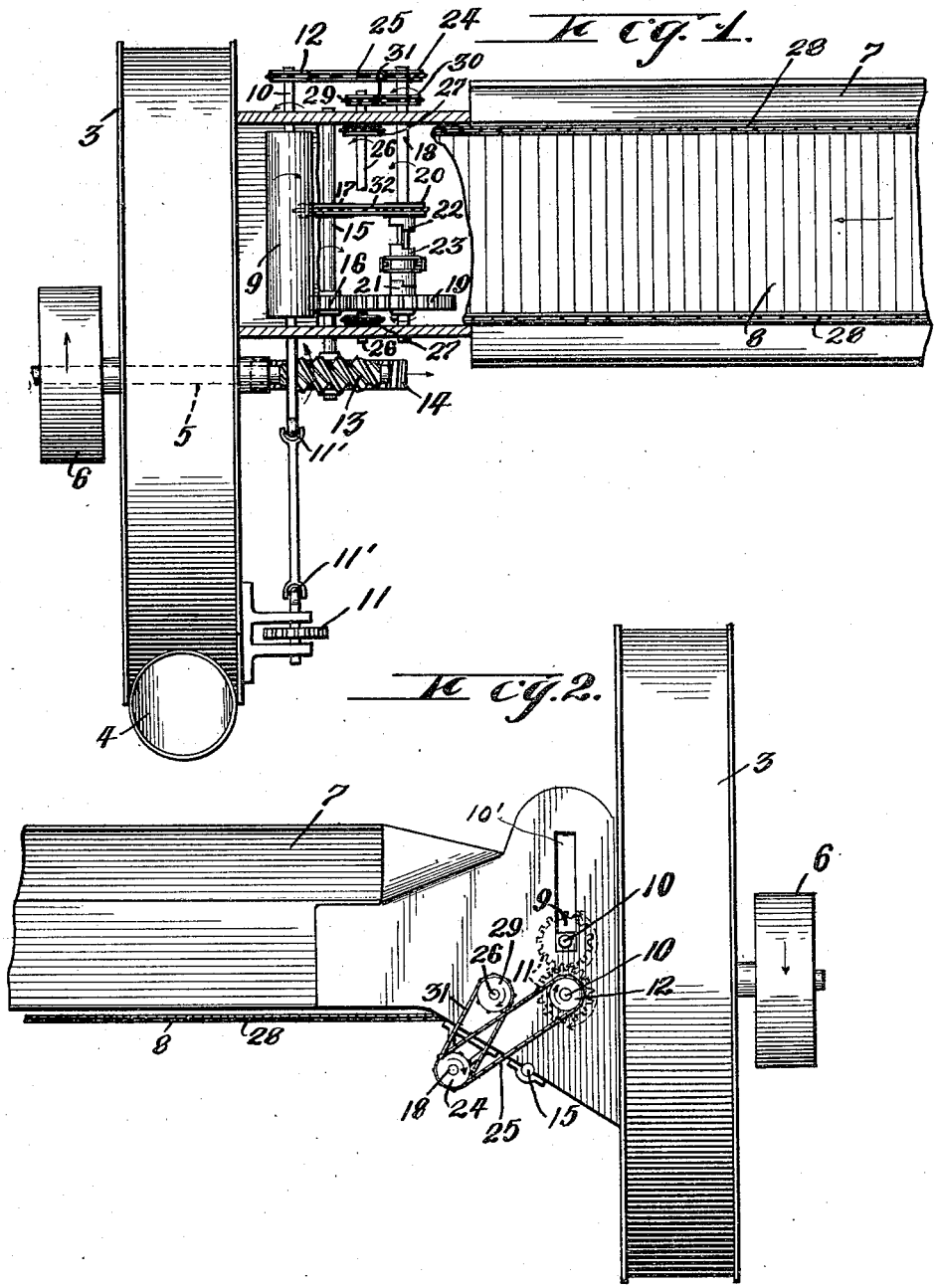

UNITED STATES PATENT OFFICE.

FRANK N. G. KRANICH, OF RACINE, WISCONSIN.

FEEDING MECHANISM FOR ENSILAGE-CUTTERS AND ANALOGOUS MACHINES.

1,184,357.   Specification of Letters Patent.   Patented May 23, 1916.

Application filed October 23, 1911. Serial No. 656,172.

*To all whom it may concern:*

Be it known that I, FRANK N. G. KRANICH, a citizen of the United States, and resident of Racine, in the county of Racine and State of Wisconsin, have invented new and useful Improvements in Feeding Mechanism for Ensilage-Cutters and Analogous Machines, of which the following is a description, reference being had to the accompanying drawings, which are a part of this specification.

My invention has relation to improvements in feeding mechanism for ensilage cutters and analogous machines.

An important object of the invention is to simplify and improve the driving mechanism for the feed belt, rolls and other rotatable parts.

A further object resides in so constructing and arranging the driving mechanism that there is a constant normal feeding action, but when there is any clogging of parts, or injury to the machinery, a rapid reverse motion of the feeding apron, or a reverse motion at a speed in excess of the feeding motion, is instantly obtainable, and the movement of the apron thereby reversed, and at the same time the direction of rotation of the upper and lower feed rolls also reversed.

With the above primary, and other incidental, objects in view, the invention consists of the devices and parts, or the equivalents thereof, as hereinafter more fully set forth and claimed.

In the accompanying drawing Figure 1 is a plan view of an ensilage cutter equipped with my improvements, parts being in section and parts broken away; and Fig. 2 is an elevation of one side of the ensilage cutter.

Referring to the drawing, the numeral 3 indicates the casing of an ensilage cutter, which is adapted to contain the wheel carrying the cutting and shredding mechanism, and other necessary interior parts (not shown). The rim or perimeter of the casing is equipped with the usual discharge pipe 4. A main drive shaft 5 extends through the casing, and upon this shaft, within the casing, is mounted the knife carrying wheel. One of the extended ends of this shaft has mounted thereon the usual belt pulley 6. Leading to the side opening of the casing is the feed table 7 and the feed apron 8. The upper and lower feed rolls 9 are located just in advance of the side opening of the casing, and are mounted on transverse shafts 10, said shafts having their bearings in the side boards of the table, with their ends extending through said bearings. The bearings of the upper shaft 10 are arranged to play vertically in slots 10' of the casing to permit the upper feed roll 9 to yieldingly bear upon the material.

The improved driving mechanism and gearing will now be described.

The shafts 10 on one side of the machine project for a considerable distance and have mounted thereon intermeshing gear wheels 11, and the extended end of the shaft of the lower roll, on the opposite side, has mounted thereon a sprocket wheel 12. The extended end of the upper shaft 10 which carries one of the gear wheels 11 is provided with universal joints 11' to permit the vertical movement of the upper roller without separating the gear wheels 11.

The extended end of the drive shaft 5 opposite the end which carries the belt pulley is formed with, or has mounted fast thereon, a worm 13. This worm meshes with a worm-wheel 14 beneath the same, said worm wheel being mounted on the extended end of a transverse shaft 15 which has its bearings in the side boards of the table. Mounted fast on this shaft, between the side boards, is a spur wheel 16 and a sprocket wheel 17. Another transverse shaft 18 is mounted in brackets depending from the under side of the side boards, and this shaft carries loose thereon a toothed wheel 19 which may be larger than the spur wheel 17 and also carries loose thereon a sprocket wheel 20, which may be smaller than the sprocket wheel 17. Toothed wheel 19 has projecting from one side thereof a clutch member 21, and sprocket wheel 20 has also projecting therefrom a clutch member 22. Splined on the shaft, between the wheels 19 and 20 is a movable clutch member 23, which is provided with the usual annular groove for the engagement therewith of an operating lever (not shown). The clutch being splined on the shaft, it is obvious that said clutch member is rotatable with the shaft but yet longitudinally movable thereon. When, therefore, the lever is moved in one direction or the other, the movable clutch member is longitudinally shifted so as to make engagement either with the clutch member of the toothed wheel 19, or the clutch member of the sprocket wheel 20.

and when in an intermediate position the parts are inoperative. One of the ends of shaft 18 is extended and carries a sprocket wheel 24, which is connected up to sprocket wheel 12 of the lower feed roll shaft by means of a sprocket chain 25. The forward apron shaft 26, shown broken away in Fig. 1, has mounted thereon, between the side boards and near to the inner faces of said boards, two sprocket wheels 27—27, and around these wheels passes the sprocket chains 28—28 of the feeding apron. One end of this apron shaft 26 is extended, and carries a sprocket wheel 29 which is connected up to a similar wheel 30 mounted on shaft 18, by means of a sprocket chain 31, or the apron shaft 26 may be driven by the sprocket chain 25 thus dispensing with the extra sprocket wheel 30. The sprocket wheel 17 on shaft 15 is connected to sprocket wheel 20 on shaft 18 by means of a sprocket chain 32.

In many forms of driving mechanisms for ensilage cutters the main drive shaft is geared up to another short longitudinal shaft, and this short longitudinal shaft in turn is geared up to other transverse shafts for causing the movement of the belt and the rotation of the feed rolls.

It will be seen that by my improved construction the short longitudinal shaft referred to is entirely dispensed with, on account of the fact that the main shaft itself has a worm thereon which meshes with a worm wheel on a transverse shaft, and from this transverse shaft the other movable parts are driven, resulting in not only simplifying the driving connections very materially, but furthermore the particular arrangement and construction are such that the feed apron feeds inwardly at a normal speed, while a rapid reverse movement of the parts is made possible, should there be a clogging during the inward feeding movement.

Referring to the operation of the mechanism, Fig. 1 shows the movable clutch member 23 in engagement with the clutch member 21 of the toothed wheel 19. When this connection is made, the rotation is as follows: from worm 13 to worm wheel 14 and shaft 15, through intermeshing spur 16 and toothed wheel 19 to shaft 18, thence from shaft 18 to shaft 10 through sprocket chain 25, and also from shaft 18 to apron shaft 26 through sprocket chain 31. The direction of rotation is such as to cause a feed into the machine, the direction of movement of the belt and the rotation of parts being indicated in Fig. 1 by arrows. As the shaft 18, under this adjustment of parts, takes its rotation from the intermeshing of the small spur gear 16 with the larger toothed gear 19, it follows that the apron feeds inwardly at a normal speed, and the feed rollers are also rotated at a constant normal speed.

Now, if there should be a clogging of parts, or injury to the mechanism, it becomes important to obtain a rapid reverse motion of the feeding apron. This rapid reverse motion of the apron is secured by shifting the clutch lever so as to disengage the movable clutch 23 from the clutch member of toothed wheel 19 and throw the same into engagement with the clutch member of sprocket wheel 20. This will immediately cause the sprocket wheels 17 and 20, and the sprocket chain connecting these two wheels to rotate the shaft 18 in a reverse direction, and consequently the apron shaft 26 will also be rotated in a reverse direction, and likewise the feeding rolls, or if desired, the clutch may be moved to a position midway between the complementary clutch members and stop the feed. Furthermore, as the sprocket wheel 17 on shaft 15 may be larger than the sprocket wheel 20 on shaft 18, it is obvious that said shaft 18 is rotated at a much more rapid speed than it was rotated when the gears 16 and 19 were active, and necessarily also the apron shaft 26 will be rotated at a more rapid speed, as well as the feed rolls, resulting, of course, in a reverse movement being imparted to the apron at a greater rate of speed than the normal feeding motion of the apron.

While my improvements are particularly designed for use in connection with ensilage cutters, yet I do not wish to be understood as confining myself to that particular adaptation, as it will be obvious that the improvements may be used to advantage in connection with various forms of feed cutters, and other mechanisms, where a feed of material to some other part of the mechanism of a machine is desirable.

What I claim is:

1. In a device of the character described, a frame, a pair of driven shafts mounted transversely in said frame, an actuating shaft and a reversely rotatable shaft also mounted in said frame in parallel relation to said driven shafts, a separate driving means between each driven shaft and said reversely rotatable shaft for directly operating said driven shafts simultaneously in either a forward or backward direction, speed decreasing gearing and speed increasing gearing connecting said actuating and reversely rotating shafts for operating the reversible shaft either forward or backward at a slow or high speed respectively, both of said speed gearing being constantly in mesh, a clutch member for alternately connecting said speed gearings to said reversible shaft, and means for driving said actuating shaft.

2. In a device of the character described, a frame, a pair of driven shafts mounted transversely in said frame, an actuating shaft and a reversely rotatable shaft also mounted in said frame in parallel relation to the driven shafts, a separate driving means between each driven shaft and said reversely rotatable shaft for directly operating said driven shafts simultaneously in either a forward or backward direction, a relatively large sprocket wheel and a relatively small gear-wheel fixed to said actuating shaft, a relatively large toothed wheel and a relatively small sprocket wheel mounted loosely on said reversely rotatable shaft, said large toothed wheel and small gear-wheel being constantly in mesh with each other to operate the reversely rotatable shaft in a forward direction at a speed slower than the speed of the actuating shaft, a sprocket chain connecting the large and small sprocket wheels to operate the reversely rotatable shaft at a higher speed than the speed of the actuating shaft, a clutch member on the reversely rotatable shaft for alternately connecting said small sprocket and large toothed wheel thereto, and means for driving said actuating shaft.

In testimony whereof, I affix my signature, in presence of two witnesses.

FRANK N. G. KRANICH.

Witnesses:
FULTON THOMPSON,
VIRGINIA GEORGE.

Copies of this patent may be obtained for five cents each, by addressing the "Commissioner of Patents, Washington, D. C."